(12) United States Patent
Huang et al.

(10) Patent No.: US 8,388,045 B2
(45) Date of Patent: Mar. 5, 2013

(54) REFRIGERATOR VAN

(75) Inventors: Tianhua Huang, Qingdao (CN); Robert Wang, Qingdao (CN); Ryan Xu, Qingdao (CN); Niancheng Zhou, Qingdao (CN)

(73) Assignees: China International Marine Containers (Group) Ltd., Guangdong (CN); Qingdao CIMC Reefer Trailer Co., Ltd., Qingdao (CN); Qingdao CIMC Special Reefer Co., Ltd., Qingdao (CN)

( * ) Notice: Subject to any disclaimer, the term of this patent is extended or adjusted under 35 U.S.C. 154(b) by 66 days.

(21) Appl. No.: 13/112,574

(22) Filed: May 20, 2011

(65) Prior Publication Data

US 2012/0292940 A1     Nov. 22, 2012

(51) Int. Cl.
*B62D 33/00* (2006.01)
(52) U.S. Cl. .................................. 296/181.1
(58) Field of Classification Search ............... 296/181.1, 296/181.2, 181.3, 181.6, 182.1, 184.1
See application file for complete search history.

(56) References Cited

U.S. PATENT DOCUMENTS

| | | | | |
|---|---|---|---|---|
| 3,097,877 A | * | 7/1963 | Erlandsen | 296/182.1 |
| 3,185,112 A | * | 5/1965 | Johnston | 52/376 |
| 3,393,920 A | * | 7/1968 | Ehrlich | 296/181.6 |
| 7,540,085 B2 | * | 6/2009 | Fenton et al. | 29/897.32 |
| 8,016,527 B2 | * | 9/2011 | Pattison et al. | 410/115 |
| 2003/0184120 A1 | * | 10/2003 | Buchholz et al. | 296/181 |
| 2008/0174147 A1 | * | 7/2008 | Skaradzinski | 296/181.3 |

* cited by examiner

*Primary Examiner* — Lori Lyjak
(74) *Attorney, Agent, or Firm* — McDonnell Boehnen Hulbert & Berghoff LLP

(57) ABSTRACT

A refrigerator van is provided, wherein a body of the refrigerator van includes a base frame, a pair of side panels disposed on the base frame, a front wall and a door end and a roof sheet. The front wall and a door end are disposed at two ends of each of the side panels oppositely. The side panels or the roof sheet or the front wall of the body includes a plurality of metal plates with a preset length, a plurality of connecting ribs and a pair of wing plates. Each metal plate is formed with a bending edge, and each connecting rib includes a locking slot for accommodating the bending edges of two adjacent metal plates. The wing plates extend from an opening of the locking slot, respectively, for connecting the metal plates.

18 Claims, 4 Drawing Sheets

REFRIGERATOR VAN

FIELD OF THE INVENTION

The invention relates to a refrigerator van (or reefer trailer, reefer truck) and, more particularly, to the construction of wall plates of a body of the refrigerator van (or the reefer trailer, the reefer truck).

BACKGROUND OF THE INVENTION

Nowadays, wall plates of most refrigerator vans (or the reefer trailer, reefer truck) are usually manufactured by a whole piece of fiber reinforce plastic (FRP), and a few refrigerator vans which require higher strength (such as military refrigerator vans) are made of metal plates (such as aluminum plate or stainless steel plate). On the one hand, the whole piece of FRP is easier to get, so it is more widely-used to manufacture the wall plate, but the wall plate made of FRP has lower strength. On the other hand, since the wall plate of the refrigerator van is much wider than normal metal coiled materials, the whole piece of metal plate for manufacturing the wall plate is not easy to get. Besides, the manufacturing cost is very high.

The conventional process for manufacturing the wall plate of the refrigerator van from metal plate is complex. Firstly, the metal coiled material is uncoiled according to the width of the wall plate, then, the uncoiled plates are arranged side-by-side along the lengthwise direction of the wall plate, and at last connected into a whole wall plate, usually by welding, which guarantees high strength and waterproofness. However, since the metal plate for manufacturing the wall plate is very thin, which is usually 0.5 millimeter (mm) to 1.5 mm, severe welding deformation is easy to appear after the welding process. Especially, the wave deformation is usually generated at the welding line, which affects the flatness of the whole plate and further affects the appearance of the wall plate. Besides, although the wall plate by the conventional process is provided with reinforcing ribs, the wall plate, which is a whole plate after the welding process, is also easy to be deformed during transportation.

Another conventional wall plate of the refrigerator van is manufactured by connecting the metal plates through bolts or rivets. When the bolts or the rivets are used, connecting holes need to be formed on the metal plates by punching. After the body is used for a period of time, the connecting parts are easy to get loose, and moist or water from outside may go into the body from the gap between the bolt or the rivet and the connecting hole to affect the temperature insulating property and increase the weight of the refrigerator van. Furthermore, connecting the metal plates by using the rivets or bolts would affect the flatness of the whole plate and further affect the appearance of the wall plate.

Therefore, the refrigerator van has higher appearance requirement for the wall plate, and all the conventional connecting ways need to process the surface of the wall plate, which may broke the surface of the plate. As a result, the conventional metal plate cannot meet the requirement above.

SUMMARY OF THE INVENTION

The objective of the invention is to provide a refrigerator van (or reefer trailer, reefer truck), the wall plate of which is formed by joining the uncoiled metal plates with a new connecting structure, without breaking the surface of the metal plates. Furthermore, the flatness of the wall plate is also ensured.

An embodiment of the invention provides a refrigerator van (or reefer trailer, reefer truck), a body of which includes a base frame, a pair of side panels disposed on the base frame, a front wall, a door end and a top plate. The front wall and the door end are oppositely disposed at two ends of the pair of the side panels. The side panel or the roof sheet or the front wall of the body includes a plurality of metal plates with a preset length and a plurality of connecting ribs. Each metal plate is formed with a bending edge, and each connecting rib includes a locking slot and a pair of wing plates. The locking slot is used for accommodating the bending edges of two side-by-side metal plates; and the wing plates extend outwardly from an opening of the locking slot for connecting the metal plates.

Another embodiment of the invention provides a refrigerator van (or reefer trailer, reefer truck), a body of which includes a base frame, a pair of side panels disposed on the base frame, a front wall, a door end and a roof sheet. The front wall and the door end are oppositely disposed at two ends of the pair of the side panels. The side panel or the roof sheet or the front wall of the body includes a plurality of metal plates with a preset length and a plurality of connecting ribs. Each metal plate is formed with a bending edge, and each connecting rib includes a locking slot for accommodating the bending edges of two side-by-side metal plates.

According to an aspect of the invention, the manufacturer only needs to perform the bending process to the edge of the metal plate, which means the manufacturing processes are less than the conventional technology. The invention is easy to perform and the manufacturing process does not damage the surface of the plates. In addition, since the way for connecting the metal plates in the invention is locking, rather than the welding, bolting and riveting connection which may damage the surface quality of the plates, the deformation appeared during the conventional splicing process is eliminated, and the appearance quality of the wall plate is improved.

According to another aspect of the invention, the connecting part of the plates in the invention is provided with edges and connecting ribs, which forms a reinforcing structure, improves the bending strength of the wall plate and replaces the conventional reinforcing ribs located at the plate.

According to still another aspect of the invention, a metal wall plate with connecting structure in the present invention is used to replace the conventional whole piece of metal plate, which not only simplifies the manufacturing process, but also greatly reduces the cost and shortens the purchasing cycle. Compared with the FRP wall plate, the invention has a lower cost, a higher strength, a better impact resistance. Therefore, the competitiveness of the product in the invention is greatly improved.

According to a fourth aspect of the invention, the wall plate with the connecting structure is manufactured by cutting and bending the metal plates and locking the metal plates by connecting ribs. If the wall plate is broken in a small area, the user only needs to cut off the broken area, and then bond a new metal plate to the broken area. This reduces the repairing difficulty and manufacturing cost.

BRIEF DESCRIPTION OF DRAWINGS

The drawings, as one part of the specification, is provided for further illustrating the embodiments of the invention, and explaining the principle of the invention, accompanied with the specification.

In different accompanying figures of the invention, the same symbols are used to represent the same elements or the elements with the same function.

DETAILED DESCRIPTION OF THE EMBODIMENTS

A preferred embodiment of the invention provides a refrigerator van (or reefer trailer, reefer truck) and the construction of a wall plate of a body of the refrigerator van (or the reefer trailer, the reefer truck).

Figure 5:
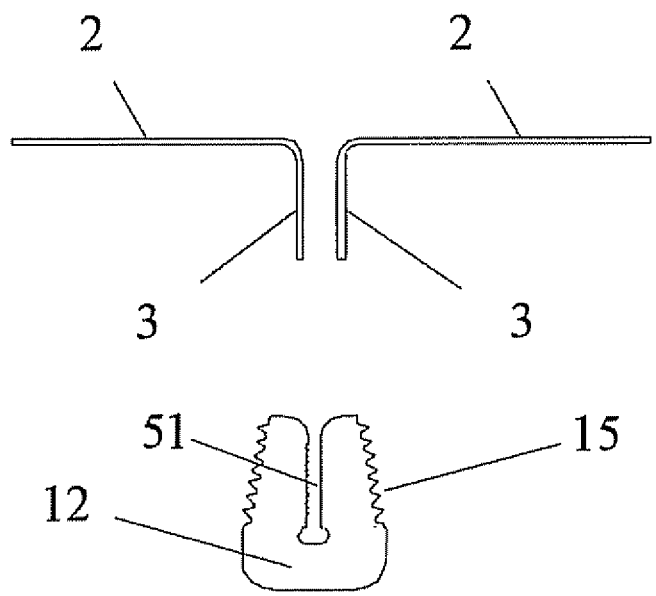
FIG. 5 is an exploded view of the connecting structure in FIG. 4.
Figure 6:
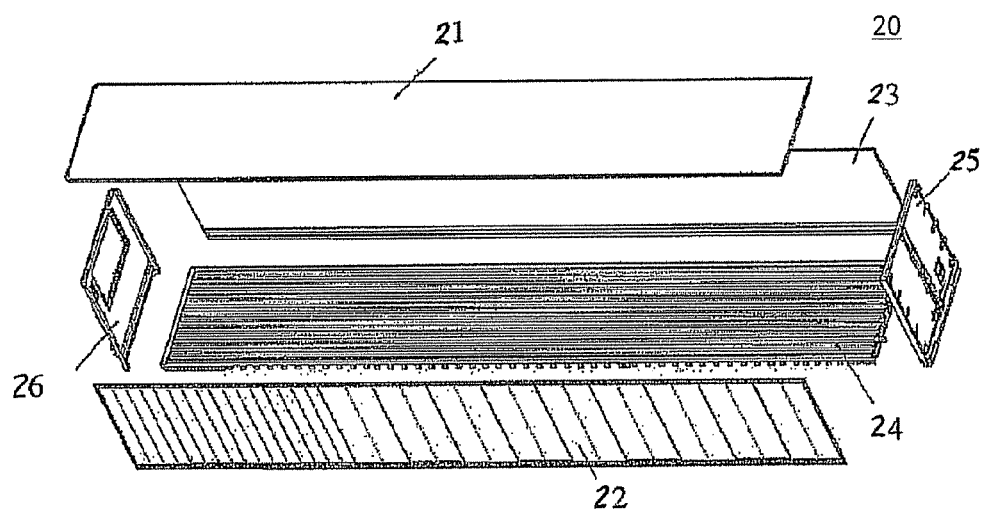
FIG. 6 is an exploded view of a refrigerator van.

FIG. 6 shows an exploded view of a typical refrigerator van. The body 20 of the refrigerator van (or the reefer trailer, reefer truck) mainly comprises a base frame 24, a pair of side panels 22, 23 disposed on the base frame 24, a front wall 26 and a door end 25 disposed at two ends of side panels oppositely and a roof sheet 21. The side panels 22, 23, the front wall 26 and the roof sheet 21 may be formed by wall plates with the same structure. The wall plate of the refrigerator van with the connecting structure is illustrated hereinafter with the accompanying FIGS. 1-5.

Figure 1:
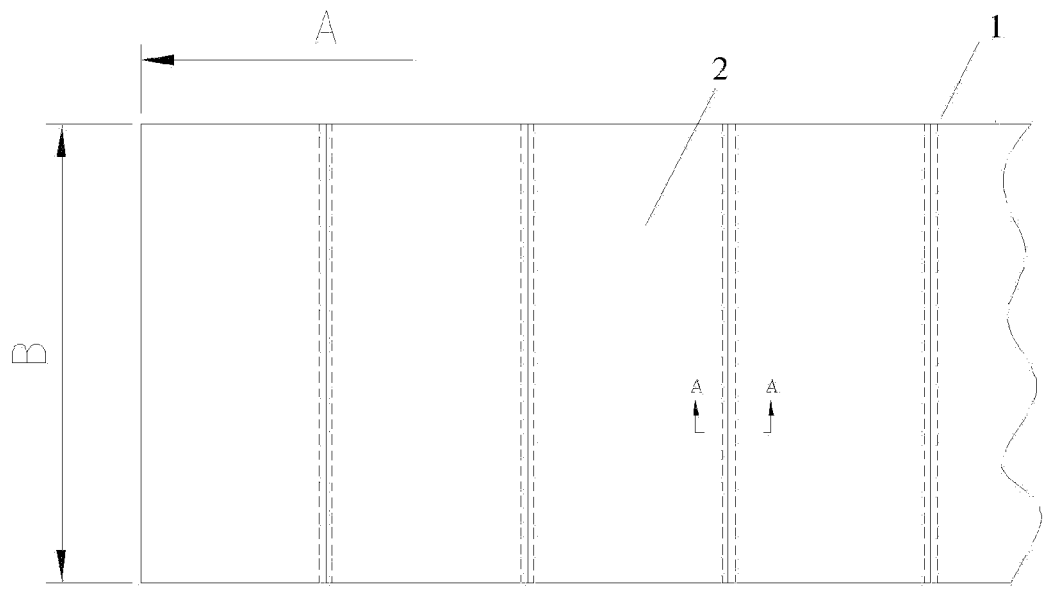
FIG. 1 is a perspective view of the wall plate in an embodiment of the invention.

FIG. 1 is a perspective view of the wall plate in an embodiment of the invention. Compared with the conventional wall plate of the refrigerator van, the wall plate in the embodiment is manufactured by a locking connection or a sticking connection, rather than the conventional welding connection, the bolt connection or the rivet connection. Thereby, the deformation of the plates during the welding, the bolting or the riveting process is eliminated and the appearance quality of the wall plate is improved.

As shown in FIG. 1, the embodiment of the invention provides a wall plate of the refrigerator van. To take the outer side panel of the refrigerator van as an example, the length A of the outer side panel of the refrigerator van is usually more than 6 meters (m), and the width B is more than 2 m. The outer side panel may be made of metal coiled materials. The metal coiled material is uncoiled according to the width B of the outer side panel to obtain a plurality of metal plates 2 with standard widths and proper lengths. The metal plates may be arranged side-by-side along the lengthwise direction of the wall plate and connected to be a whole, and then they are manufactured to be the wall plate 1.

Figure 2:
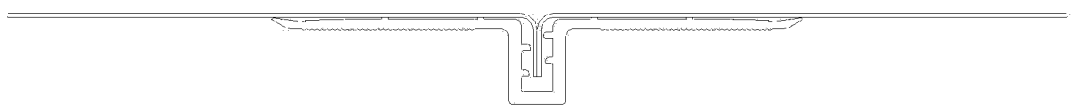
FIG. 2 is a sectional view along line A-A in FIG. 1, which shows a connecting structure adapted to metal plates in the embodiment of the invention.
Figure 3A:
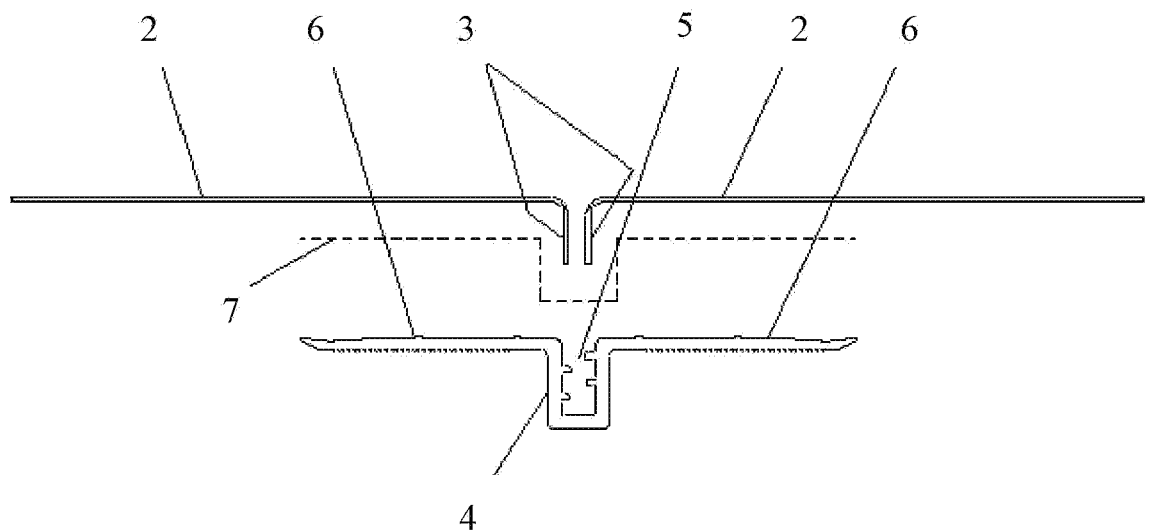
FIG. 3A and FIG. 3B are exploded views of the connecting structure in FIG. 2.
Figure 3B:
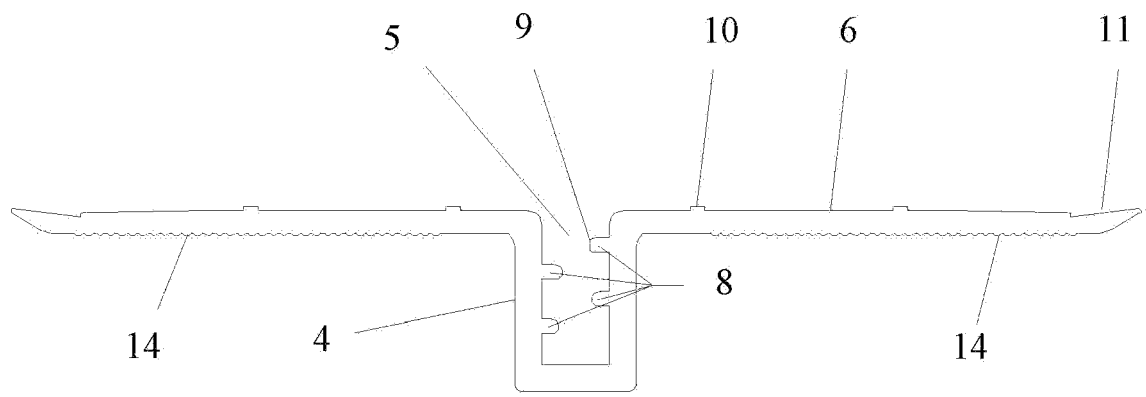

FIG. 2 is a sectional view along line A-A in FIG. 1, which shows the connecting structure adapted to metal plates in the embodiment of the invention. FIG. 3A and FIG. 3B are exploded view of the connecting structure in FIG. 2.

The metal coiled material in FIG. 1 may be made of coated color steel coiled material with standard width (the coated color steel coiled materials produced in different manufacturers are slightly different in length, which varies from 1200 mm to 1400 mm). Alternatively, the metal coiled material may also be made of metal plates such as stainless steel board, stainless iron board or aluminum board. The coated color steel coiled material is uncoiled according to the width B of the outer side panel, and a plurality of coated color steel plates 2 with standard width and proper length are obtained by cutting the uncoiled coated color steel.

As shown in FIG. 2 and FIG. 3A, the wall plate according to the first embodiment of the invention includes a plurality of coated color steel plates 2, a connecting rib 4 for connecting two adjacent plates 2 and glue 7 for sticking the coated color steel plates 2 and the connecting rib 4. The coated color steel plates 2 along the width direction of the outer side panel are bent inwardly to form two bending edges 3. Alternatively, the bending edges may be L-shaped or C-shaped. A locking slot 5 is disposed in the middle of the connecting rib 4, and two sides of the connecting rib 4 are provided with a wing plate 6, respectively. The bending edges 3 of the adjacent two coated color steel plates 2 are inserted in a locking slot 5 of the aluminum connecting rib 4 together. Alternatively, the connecting rib 4 may also be made of other metal or plastic (such as polyvinyl chloride (PVC) and Acrylonitrile Butadiene Styrene (ABS)). The inner surface of the adjacent two coated color steel plates 2 and the wing plates 6 at two sides of the aluminum connecting rib 4 are stuck together by glue 7, and a sticking layer is disposed between the locking slot 5 and the bending edge 3. Alternatively, the glue 7 may be replaced by other adhesive substance to achieve the connection between the adjacent two coated color steel plates 2.

As shown in FIG. 3B, in an embodiment of the invention, the aluminum connecting rib 4 is "Ω" shaped.

In another embodiment of the invention, as shown in FIG. 3B, two inner walls of the locking slot 5 are provided with a plurality of teeth 8 in staggered arrangement. As a result, the module of the aluminum connecting rib 4 can be open and machining error generated during forming the bending edge 3 can be partly eliminated. The ends of the teeth may be arc 9, which facilitate inserting the two bending edges 3 into the locking slot 5 at the same time.

In an embodiment of the invention, as shown in FIG. 3B, a side surface of the wing plate 6 is provided with a plurality of protrusions 10, for ensuring that the thickness of the glue 7 is fixed when the inner surface of the coated color steel plate 2 and the wing plate 6 are stuck to each other, and thereby ensuring the sticking quality.

In still another embodiment of the invention, as shown in FIG. 3B, the outer edges of the wing plates 6 are provided with recesses 11, to prevent the glue from overflowing and contaminating the environment when the inner surface of the coated color steel plate 2 and the wing plates 6 are stuck to each other.

Besides, as shown in FIG. 3B, since the inner wall of the plate 2 may have foam and the connecting rib 4 may be wrapped by foam, the lower surface of the wing plate 6 of the connecting rib 4 may be provided with wave structure 14 to increase the contacting area between the wing plates 6 and the foam, improve the connection between the foam and the connecting rib 4, reduce the rate of delamination of the foam from the wing plate 6 and prevent the delamination part from extending.

Figure 4:
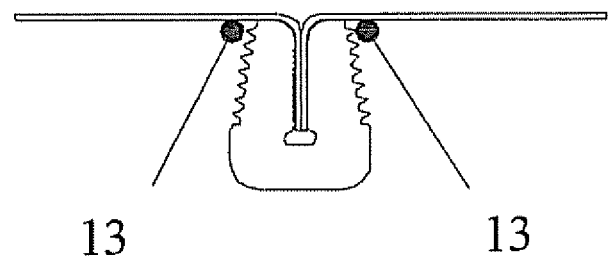
FIG. 4 is a sectional view along line A-A in FIG. 1, which shows a connecting structure in the another embodiment of the invention.

FIG. 4 is a sectional view of the connecting structure along line A-A in FIG. 1 according to the second embodiment of the invention. FIG. 5 is an exploded view of the connecting structure in FIG. 4.

As shown in FIG. 4 and FIG. 5, in the second embodiment of the invention, the metal plates 2 along the width direction of the side panel are fanned with two bending edges 3 bending inwardly. Alternatively, the bending edges are L-shaped or C-shaped, and the bending edges 3 of the two adjacent metal plates 2 are inserted into the inserting slot 51 in the middle of the PVC connecting rib 12 to achieve the connection, thereby manufacturing the whole outer side panel. Alternatively, the connecting ribs 12 may also be made of metal (such as aluminum) or plastic (such as ABS).

Besides, the inner wall of the plate 2 may have foam to make the connecting rib 12 wrapped by the foam. Therefore, sealing glue 13 may be disposed between the contacting area of the inserting slot in the middle of the connecting rib 12 and the metal plate (as shown in FIG. 4) to prevent the foam liquid from leaking or prevent the water seepage of the inserting part. Since the area of the section of the connecting rib 12 near the plate 2 is small, and the area of the section away from the plate 2 is large, the foam near the plate is well-fixed to prevent the delamination. Besides, as shown in FIG. 5, the outer surface of the connecting rib 12 is provided with teeth structure 15, thereby improving the combination between the foam cells and the connecting rib.

The connecting rib 12 is preferably U-shaped, and the opening width of the inserting slot is less than the total thickness of the two bending edges 3. Therefore, the bending edges 3 of the two adjacent metal plates are pressed and deformed to generate the deformation force, and further achieve the tight connection.

The wall plate manufactured according to the above embodiment may be used to manufacture the inner and outer side panels, the inner and outer roof sheets, the inner board and outer board of the front wall of the refrigerator van and so on. Since the way for connecting the metal plates in the invention is locking and sticking, rather than the welding, bolting and riveting connection which may damage the surface quality of the plates, the deformation appeared during the conventional connecting process is eliminated, and the appearance quality of the wall plate is improved.

Besides, in the invention, a metal wall plate with connecting structure in the present invention is used to replace the conventional whole piece of metal plate, which not only simplifies the manufacturing process, but also greatly reduces the cost and shortens the purchasing cycle. Compared with the FRP wall plate, the invention has a lower cost, a higher strength, a better impact resistance. Therefore, the competitiveness of the product in the invention is greatly improved.

Besides, the conventional manufactured wall plate is a whole plate, deformation often occurs during not only the welding process, but also the transportation process. The connecting part of the plates in the invention is provided with edges and connecting ribs, which forms a reinforcing structure, thereby improving the bending strength of the wall plate and leaving out the conventional reinforcing ribs disposed on the plate.

Furthermore, if moisture or water goes into the foam cells of the refrigerator van, the temperature insulating property would be affected and the weight of the refrigerator van are increased, which needs to be prevented. In the invention, the metal plates forming the wall plate are connected in the locking connection or sticking connection, glue and other adhesive substance can isolate the water and moisture effectively. Besides, since there is no bolt connection or rivet connection, water or moisture cannot go into the foam cells of the refrigerator van via bolt holes or rivet holes. Therefore, the refrigerator van has good water-tightness and air-tightness.

Moreover, the wall plate with the connecting structure is manufactured by cutting and bending the metal plates and locking the metal plates by connecting ribs. If the wall plate is broken in a small area, the user only needs to cut off the broken area, and then bond a new metal plate to the broken area. This reduces the repairing difficulty and manufacturing cost. So, it is easy to repair the wall plate.

What is claimed is:

1. A refrigerator van, a body of which comprising:
a base frame;
a pair of side panels disposed on the base frame;
a front wall and a door end oppositely disposed at two ends of the pair of the side panels; and
a roof sheet, wherein the side panel or the roof sheet or the front wall of the body includes: a plurality of metal plates with a preset length, each of which is formed with a bending edge; a plurality of connecting ribs, each of which including: a locking slot for accommodating the bending edges of two side-by-side metal plates; and a pair of wing plates extending outwardly from an opening of the locking slot, respectively, for connecting the metal plates.

2. The refrigerator van according to claim 1, wherein two inner walls of the locking slot are provided with teeth in stagger arrangement.

3. The refrigerator van according to claim 2, wherein the ends of the teeth are arc-shaped.

4. The refrigerator van according to claim 1, wherein one side surface of each wing plate is provided with a plurality of protrusions.

5. The refrigerator van according to claim 4, wherein an edge of each wing plate is provided with a recess.

6. The refrigerator van according to claim 5, wherein the wing plates and the metal plates are stuck to each other.

7. The refrigerator van according to claim 6, wherein a sticking layer is disposed between the locking slot and the bending edge.

8. The refrigerator van according to claim 1, wherein the connecting ribs are made of metal.

9. The refrigerator van according to claim 7, wherein the connecting ribs are made of aluminum.

10. The refrigerator van according to claim 1, wherein the other side surface of each wing plate is provided with a wave structure.

11. A refrigerator van, a body of which comprising:
a base frame;
a pair of side panels disposed on the base frame;
a front wall and a door end oppositely disposed at two ends of the pair of the side panels; and
a roof sheet, wherein the side panel or the roof sheet or the front wall of the body includes: a plurality of metal plates with a preset length, each of which is provided with a bending edge; a plurality of connecting ribs, each of which includes an inserting slot for accommodating the bending edges of two side-by-side metal plates.

12. The refrigerator van according to claim 11, wherein the width of the opening of the inserting slot is smaller than the total thickness of the two bending edges.

13. The refrigerator van according to claim 12, wherein sealing glue is disposed between the connecting ribs and the metal plates.

14. The refrigerator van according to claim 12, wherein the connecting ribs are made of plastic.

15. The refrigerator van according to claim 11, wherein the outer surface of the connecting rib is provided with teeth structure.

16. The refrigerator van according to claim 11, wherein the area of section of the connecting rib increases along with the increment of distance between the section and the metal plate.

17. The refrigerator van according to claim 3, wherein one side surface of each wing plate is provided with a plurality of protrusions.

18. A wall plate for a refrigerator van comprising:
a plurality of metal plates with a preset length, each of which is formed with a bending edge;
a plurality of connecting ribs, each of which includes
  i. a locking slot for accommodating the bending edges of two side-by-side metal plates; and
  ii. a pair of wing plates extending outwardly from an opening of the locking slot, respectively, for connecting the metal plates.

* * * * *